RE 25719

Nov. 21, 1961 F. A. JOHNSON ET AL 3,009,759

POSITIONER FOR A MAGNETIC DATA STORAGE DEVICE

Filed Nov. 13, 1958 5 Sheets-Sheet 1

Inventors
Forrest A. Johnson & Herbert E. Miller
by Sughrue and Rothwell
Attys

POSITIONER FOR A MAGNETIC DATA STORAGE DEVICE

Filed Nov. 13, 1958 5 Sheets-Sheet 2

Inventors
Forrest A. Johnson & Herbert E. Miller
by Sughrue and Rothwell Attys

Inventors
Forrest A. Johnson & Herbert E. Miller
by Sughrue and Rothwell Attys

Nov. 21, 1961 F. A. JOHNSON ET AL 3,009,759

POSITIONER FOR A MAGNETIC DATA STORAGE DEVICE

Filed Nov. 13, 1958 5 Sheets-Sheet 4

Inventors
Forrest A. Johnson & Herbert A. Miller
by Sughrue and Rothwell Attys

Inventors
Forrest A. Johnson
Herbert E. Miller
by Sughrue and Rothwell Attys

United States Patent Office 3,009,759

Patented Nov. 21, 1961

3,009,759

POSITIONER FOR A MAGNETIC DATA STORAGE DEVICE

Forrest A. Johnson, Springfield, Vt., and Herbert E. Miller, West Acton, Mass., assignors, by mesne assignments, to Ex-Cell-O Corporation, Detroit, Mich., a corporation of Michigan Filed Nov. 13, 1958, Ser. No. 773,585
11 Claims. (Cl. 346—74)

This invention relates to a positioner adapted for use with a magnetic data storage device, and more particularly to an apparatus for rapidly, accurately and positively positioning a member, such as a transducer head, at a discrete position preselected from a range of such positions in response to a command signal.

The invention has special application to magnetic data storage devices in which the accurate and rapid positioning of a magnetic transducer head in register with a preselected track of the record or storage medium is absolutely necessary for the satisfactory operation of the device.

In the fields of electronic data processing and digital computers, magnetic data storage devices have assumed an increasingly important role. Magnetic data storage devices usually employ a magnetizable surface layer of tapes, drums, or discs as the record storage medium for intelligence imparted by pulses from a magnetic transducer head located with its magnetic flux path forming pole pieces facing the record medium and spaced adjacent thereto. Some of the known magnetic data storage devices have previously been provided with the transducer head in a fixed position relative to a distinct record track on the moving storage medium. Such arrangements are now used in some magnetic data storage devices having several hundred tracks, each with their corresponding transducer heads. With the requirement for increased storage area, it is necessary to provide an increased number of storage tracks. Thus, when the magnetic data storage device becomes so large as to require several hundred or even thousands of tracks, the economics of using one transducer head for each track becomes prohibitive. One solution for decreasing the number of transducer heads would be to use only one head and, on demand, position this head in register with a preselected track. However, this would involve moving the head over a comparatively great distance, and often over a tortuous path. This arrangement would therefore slow down the access time for moving from one track to another and a quick access time is essential to the efficient operation of a magnetic data storage device. This invention provides a compromise between the above-discussed extremes wherein there are a number of magnetic transducer heads, which number is considerably less than the number of record tracks, and these transducer heads are spaced along the tracks. This arrangement is thus considerably more economical than using one head per track.

It is a principal object of this invention to provide a novel positioner operable to accurately and rapidly move a head to any preselected track within a predetermined zone of tracks, thus affording quick access time and precise head and track alignment.

Another object of this invention is to provide means capable of accepting electric signals in the form of binary digits and, in response to this command signal, cause a member to move a transducer head from any current record track to any desired track preselected from a range of such tracks.

An additional object of this invention is to provide a positioner, including servo means under constant velocity control, capable of moving a member to the proximity of a desired position and a detent means capable of superimposing a movement on the member independent of the servo means for final accurate positioning and further locking of the member in the desired exact position.

A further object of this invention is to provide a positioner including a locking detent which is characterized by the absence of lost motion between the member and the detent.

Other objects and advantages of this invention will be apparent from the following detailed description of the preferred embodiment with reference to the accompanying drawings wherein.

In general, this invention concerns a positioner mechanism for a magnetic data storage device. In the illustrated embodiment the magnetic data storage device is of the rotating disc type having a plurality of transducer heads associated with these discs, which heads are movable radially to any desired or selected recording track on the disc surface. The positioner mechanism for selecting the desired track includes a servo motor operable in response to an electric signal to move a transducer head carrier to position a head in the vicinity of the selected track, and a locking detent for superimposing an accurate and final fine adjustment to precisely locate the head at the selected track. The detent also functions to lock the head in the selected location and is operable independently of the servo motor which initially moves the heads.

Figures 1, 2:
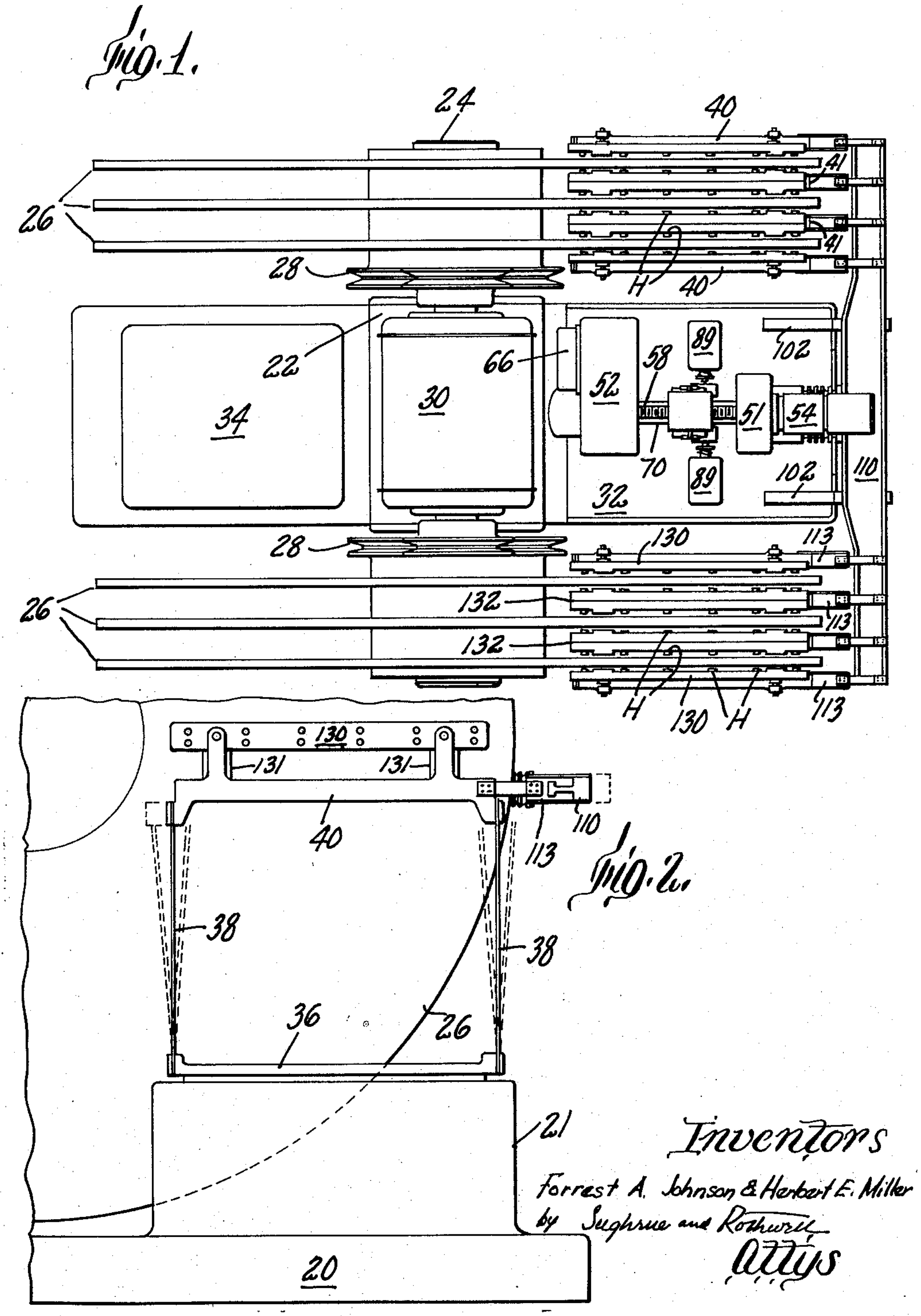
FIG. 1 is a top plan view of the magnetic data storage device of this invention.
FIG. 2 is a fragmental elevational view of a portion of the device shown in FIG. 1.

Referring to the drawings, FIG. 1 is a plan view of a magnetic data storage device wherein the storage medium is in the form of rotatable discs. A base 20 supports a bearing housing 22 in which is journaled a shaft 24, this shaft extending outwardly from both ends of the housing. A plurality of discs 26 are keyed to these shaft extensions as are V-belt pulleys 28. A motor 30 is mounted on top of housing 22 for driving the shaft 24 by suitable V belts (not shown). A positioner mechanism assembly, generally noted by the numeral 32, is also supported by base 20 and the details of this positioner mechanism will be described hereinafter. On the opposite side of the bearing housing 22 from the positioner mechanism assembly 32 is a cabinet 34 containing electrical controls for the apparatus in general and in particular for the assembly 32.

Figures 5, 9, 10, 11:
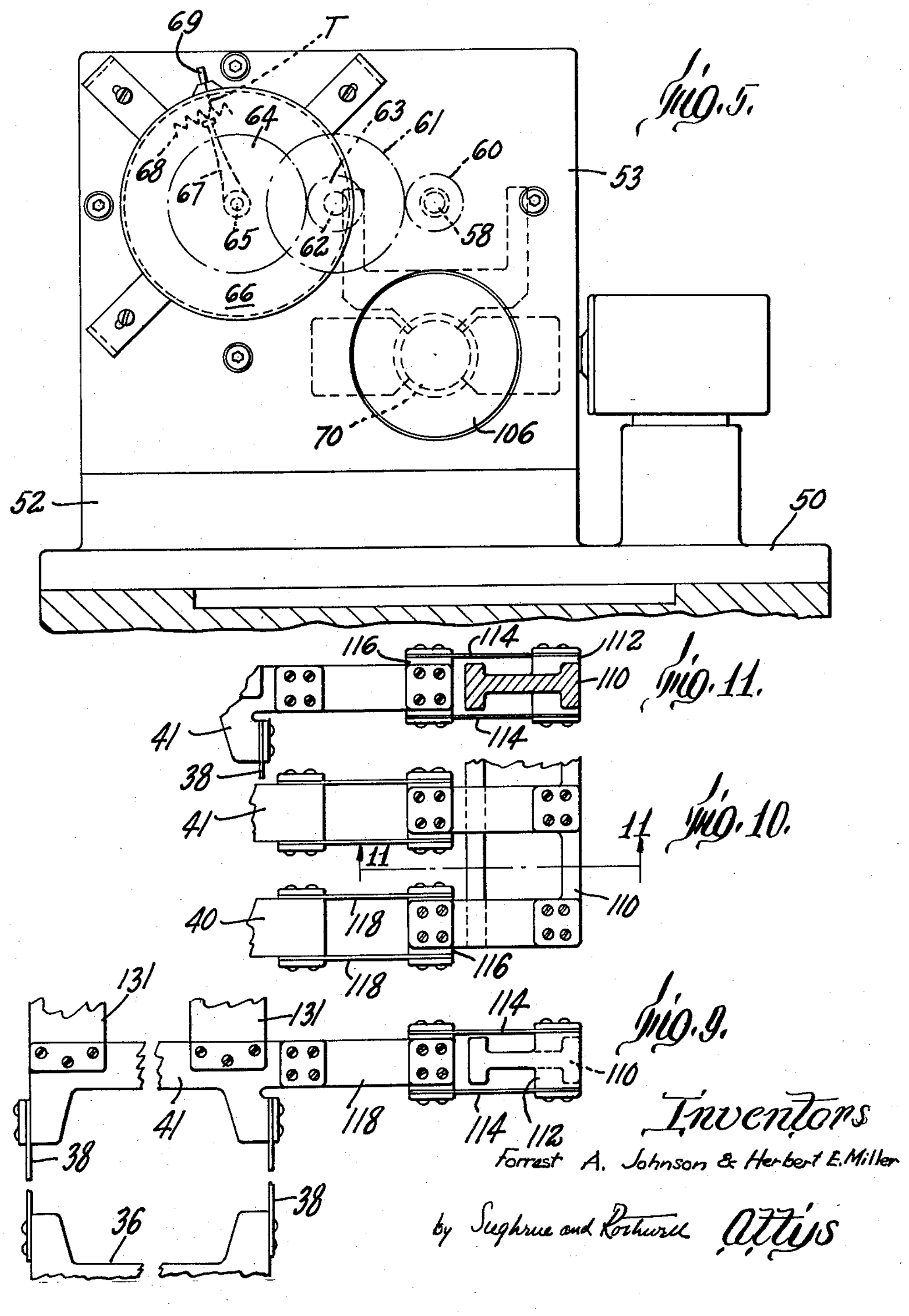
FIG. 5 is a left end elevation view with reference to FIG. 3.
FIG. 9 is a fragmental elevation view of a portion of the apparatus shown in FIG. 1.
FIG. 10 is a plan view of a portion of the apparatus shown in FIG. 9.
FIG. 11 is a sectional view taken along line 11—11 of FIG. 10.

Each disc 26 has a magnetizable surface layer on both radial faces thereof, and facing this layer are a series of magnetic transducer heads H with their pole pieces spaced from the disc surface in a manner well known in the art. These heads are supported by carrier members 130 and 132, respectively, carrier 130 is the support at the extreme outboard disc surfaces of each group of discs and carrier 132 is the support for the transducer heads adjacent the intermediate inboard surfaces. These carriers and the means for spacing the air gap of the transducer heads carried thereby are described in detail in our copending application Serial No. 773,586, filed November 13, 1958. The carriers 130 and 132 are supported by flexible reeds 131 attached to the carriers and to supporting frame members 40 and 41, respectively, as shown in FIGS. 2 and 9. Since the carriers per se form no essential part of the present invention, they will not be described in detail herein.

Depending upwardly from base plate 20 are a series of ribs 21, FIG. 2, arranged in juxtaposition to each disc 26, one rib between each disc, and one rib outside the outer disc of each group. A bracket 36 is secured to the upper surface of ribs 21 by screws or other conventional means and the lower ends of parallel reeds 38—38 are attached to bracket 36. The upper ends of these reeds 38—38 are attached in a similar manner to their corresponding frame members 40 and 41, respectively, FIGS. 2 and 9. These reeds will afford rectilinear movement only from a position of repose, which movement is consequently imparted to the frames 40 and 41, respectively, as shown by the dotted lines in FIG. 2.

Figures 3, 4:
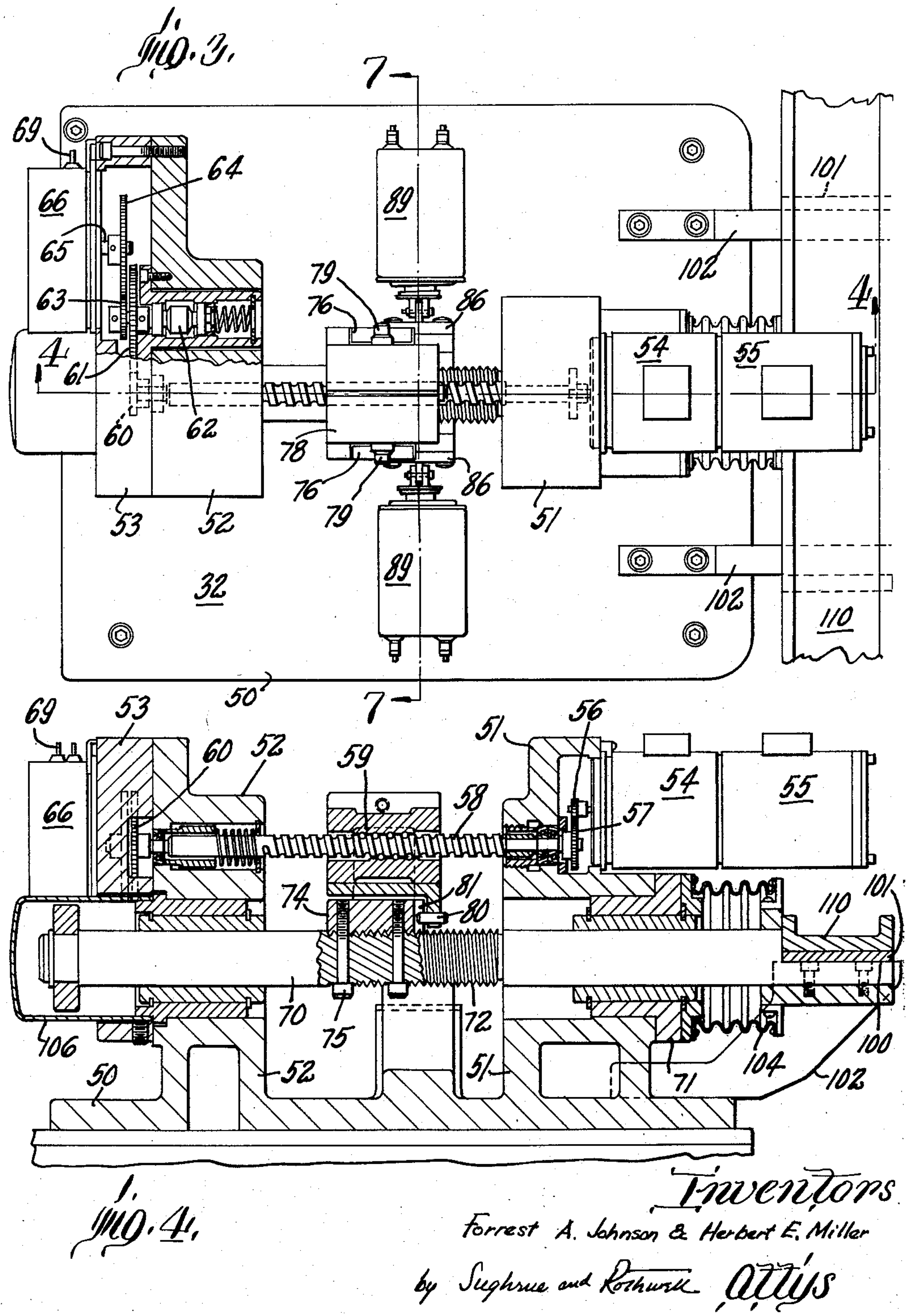
FIG. 3 is a top plan view, partially in section, of the positioning mechanism assembly.
FIG. 4 is a sectional view taken along line 4—4 of FIG. 3.

The positioner mechanism assembly 32 of FIG. 1, shown in detail in FIG. 3, is the actuating mechanism for moving and controlling the position of the magnetic transducer heads by controlling the position of the head carrier supporting frames 40 and 41. A bed plate 50 is attached by suitable means to base plate 20 and includes an integral right housing portion 51 and left housing portion 52, the latter being provided with a cover 53 secured to its outer vertical face, FIGS. 4 and 5. An electric servo motor 54 and a tachometer 55 are attached to the vertical outside face of housing 51 with their shafts coupled together in colinear relationship. The end of the servo motor shaft extends into a cavity of housing 51 and a pinion 56 is secured thereto. This pinion is in mesh with a gear 57 rigidly secured to the end of a transfer screw 58 which is journaled for rotative motion only in housing portions 51 and 52. The transfer screw 58 is provided with threads intermediate its journaling portions, which threads are in engagement with a correspondingly threaded nut member 59. A pinion 60 is keyed to the end of shaft 58 opposite the pinion 57 and pinion 60 is in mesh with a gear 61 on a shaft 62 journaled in housing portion 52, FIG. 3. A pinion 63 is also keyed to shaft 62 and this pinion is in mesh with a gear 64 rigidly secured to the end of a shaft 65 of a potentiometer 66. The end of shaft 65 inside the potentiometer housing carries a wiper 67 adapted to contact a winding 68 in a well known manner as shown in FIG. 5. The winding 68 is provided with multiple winding taps T and tap connectors 69.

Directly below the transfer screw 58 is a bar 70 journaled for longitudinal movement only in housing portions 51 and 52. An intermediate portion of the bar 70 is provided with screw threads which are V-shaped in cross section. A coupling member 74 includes a threaded portion engaging corresponding threads on bar 70 and is rigidly fixed thereto by screws 75. A pair of upwardly extending yoke portions 76 of member 74 are provided with slots 77 in the upper ends thereof, FIG. 7. A holder 78 envelops the nut 59 and holds this nut in fixed relationship thereto. A pair of pins 79, one projecting from each side of the holder 78, engage the sides of slots 77 such that longitudinal movement imparted to the holder 78 by transfer screw 58 through the intermediary of nut 59 is transferred to the coupling 74 and thereby to bar 70. To prevent any rotational movement of bar 70 due to torsional forces, the holder 78 is provided with a protruding pin 80, FIG. 4, with its free end in engagement with a keying slot 81 in coupling 74.

The purpose of the threaded portion 72 of bar 70 is to serve as an element of a detent mechanism. This detent mechanism is adapted to superimpose an additional and fine adjusting movement to bar 70 as well as to lock this bar in the desired adjusted position. The other elements of the detent mechanism include a left detent coupler 82 and a right detent coupler 83 located diametrically opposite each other and adjacent bar 70, FIG. 7. These couplers 82 and 83 have threaded portions complementary to the threads 72 on the bar 70. Each coupler is supported by a pair of reeds 84—84 attached thereto. These reeds are spaced from each other by a block 85 and are joined to the coupler to form a rigid unit together with a solenoid coupler 86. The other end of reeds 84—84 are similarly spaced apart by block 88 and are rigidly secured to a lug 87 depending from the bed plate 50. Thus, the reed suspension provides a support for the detent couplers allowing movement with one degree of freedom only toward and away from the center of the bar 70. Solenoids 89—89 are mounted on the upper surface of portions 90—90 which extend upwardly from base 50, and these solenoids have the axes of their armatures aligned in a plane coinciding with the axis of bar 70. Springs 92 are provided to bias the detent couplers 82, 83 into engagement with the threads 72 of bar 70 and the armatures of solenoids 89—89 are pivotally connected to the couplers 86—86. Thus, when the solenoids are selectively de-energized, the springs 92 will force the coupler of the de-energized solenoid into engagement with the threads 72 of bar 70 and when the solenoid is energized the associated coupler will be retracted from engagement with the bar 70.

Figures 7, 8:
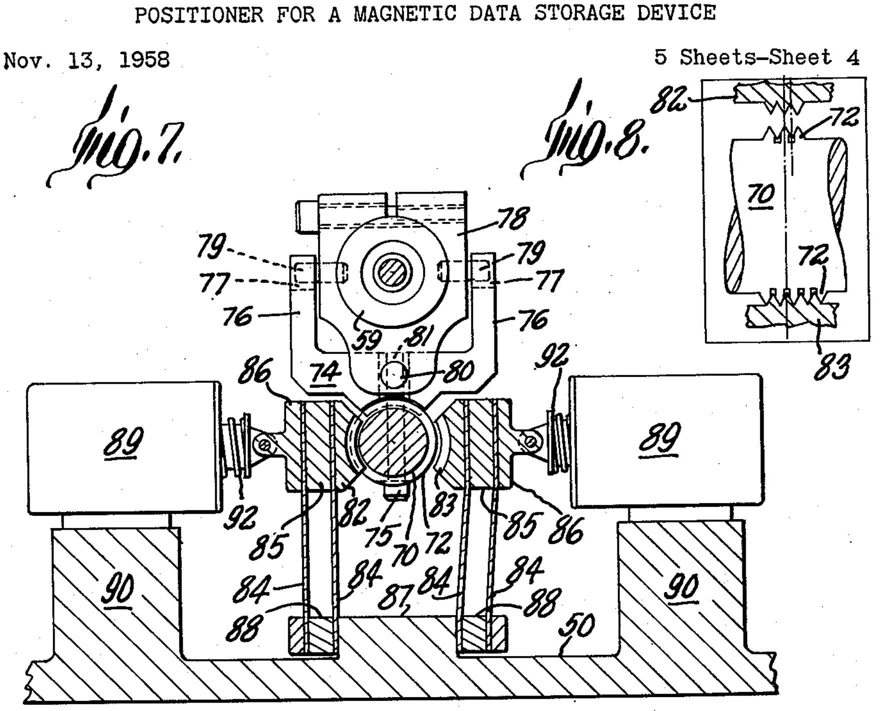
FIG. 7 is a sectional view taken along line 7—7 of FIG. 3.
FIG. 8 is a schematic view illustrating the locking detent mechanism shown in FIG. 7.

A single detent mechanism may be utilized, but in the preferred embodiment illustrated herein a double detent enables the use of a coarser thread pitch, thereby increasing the strength and useful life of the detent components. As illustrated in FIG. 8, by staggering the longitudinal position of a thread crest of one detent coupler a half pitch relative to the crest of the other detent coupler, it is possible to achieve a detent positioning function of the bar 70 which is one-half the pitch of the screw thread 72 thereon. For example, if the pitch of thread 72 were one-sixteenth inch, by using the double detent the bar may be positioned accurately and locked in a position which is incrementally adjustable to every one thirty-second inch.

Although screw threads are preferred for the described detent function because of their convenience and inherent accuracy in manufacturing, other forms of detent mechanisms are possible, e.g., annular grooves having tapered sides.

Figure 6:
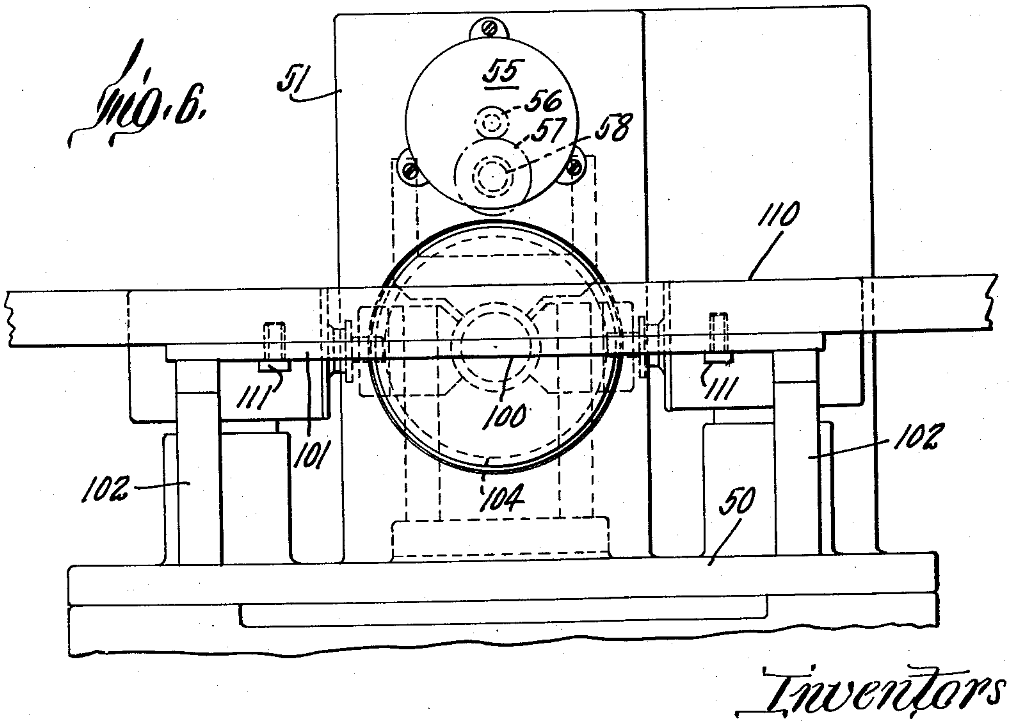
FIG. 6 is a right end elevation view with reference to FIG. 3.

As viewed in FIGS. 4 and 6, the bar 70 has a flat portion 100 in one extreme thereof and a stabilizer member 101 is rigidly attached thereto by suitable means. This stabilizer member extends transversely to bar 70 and is supported for sliding movement on the top surfaces of a pair of brackets 102—102 secured to bed plate 50. A bellows assembly 104 secured to bar 70 and a bar bearing 71 forms a protective seal between the stabilizer member 101 and the bearing 71 in housing 51. A cap 106 mounted in housing 52 constitutes a protective seal about the opposite end of bar 70.

Figure 12:
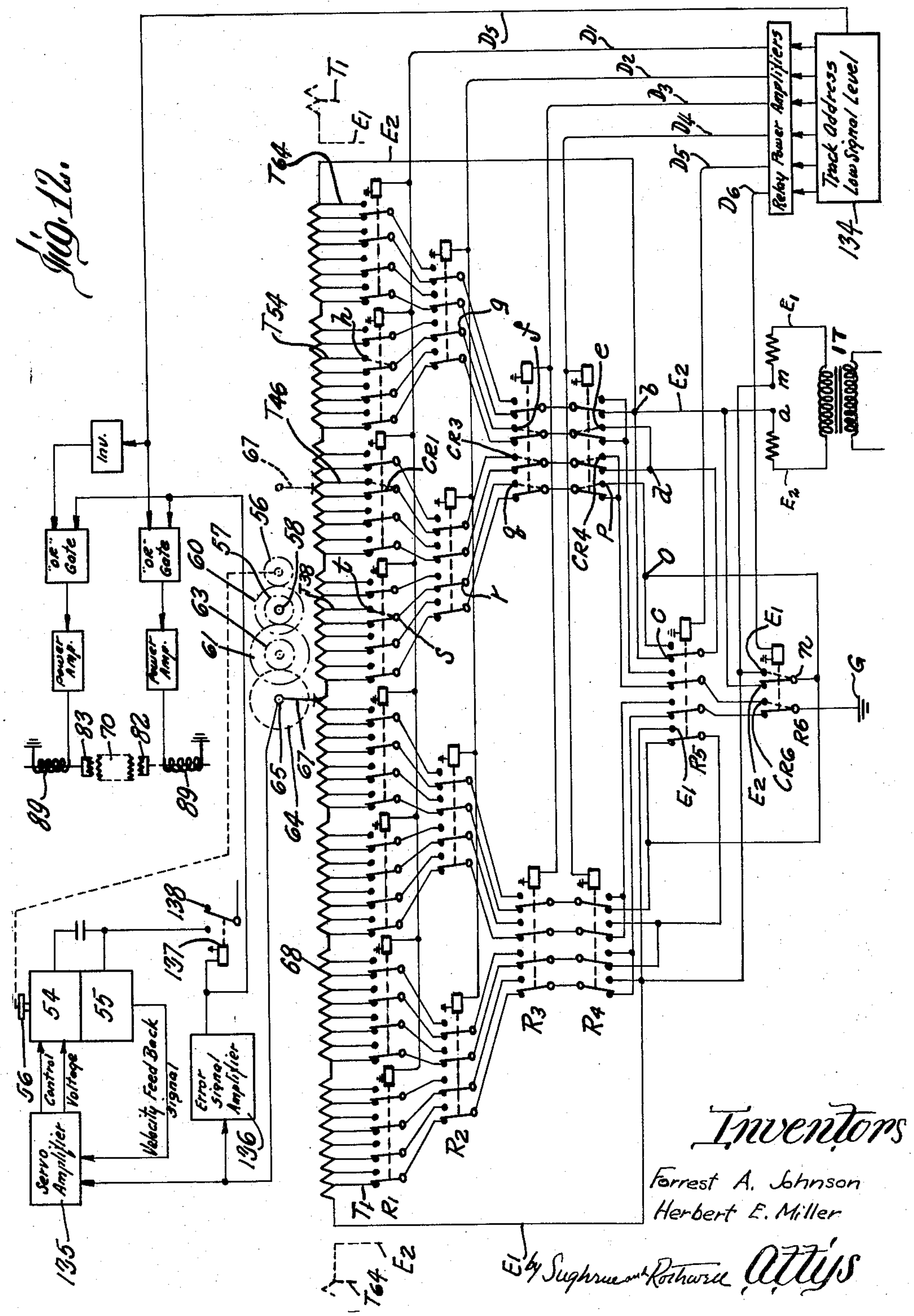
FIG. 12 is a diagrammatic showing of the positioner and a circuit diagram of the significant portions of the operating circuit.

An elongated transfer member or T-bar 110 is secured to the stabilizer member 101 by means of suitable screws 111, FIG. 6. This T-bar 110 extends outwardly to a position adjacent the outer support frames 40, FIG. 1. The central portion of the T-bar 101 is generally U-shaped in cross section, FIG. 4, and the extending outboard portions are generally I-shaped in cross section, FIG. 11. These extending outboard portions have a series of lugs 112 thereon and these lugs terminate in parallel surfaces as shown in FIGS. 9 and 12. A lug 112 is provided at each position of the supporting ribs 21 and the carrying frames 40 and 41. A coupling device 113, FIG. 1, is shown in detail in FIGS. 9, 10, and 11. This coupling device is adapted to provide the coupling between the transfer or T-bar 110 and the frames 40 and 41. A pair of parallel reeds 114—114 are attached at one end by suitable means to the parallel surfaces of each lug 112 and the other ends of these reeds are secured to a generally cube-shaped block 116. Another pair of parallel reeds 118—118 are also secured at one end thereof to block 116 on the faces 90° spaced from the faces to which reeds 114—114 are attached. The other ends of reeds 118—118 are secured to the frames 40 and 41, respectively, as they exist at the locations adjacent the surfaces of discs 26. The above-described arrangement constitutes the couplings 113 between the T bar and the frames 40 and 41. These couplings have the property of being rigid in a direction of movement when the transducer heads are moved radially with respect to the center of rotation of the discs, while permitting limited mis-alignment in two planes spaced 90° from each other transverse to the direction of movement.

FIG. 12 is a combined schematic and circuit diagram of the positioner device, and shows the gear train from pinion 56 of the servo motor 54 to transfer screw 58 through gear 57 and then through gears 60, 61, and 63 to gear 64 on the wiper shaft 65 of the potentiometer 66. The potentiometer wiper 67 contacts a point on the potentiometer winding 68, which is shown unfolded to selectively connect any one of the taps $T_1$ to $T_{64}$. These taps of the potentiometer winding are each connected to be one contact of circuit switches controlled by a first group of relays $R_1$ of a relay tree containing further groups of relays $R_2$, $R_3$, $R_4$, $R_5$, and $R_6$. The excitation of the tapped potentiometer is from an ungrounded isolation transformer IT. Any tap of the potentiometer may be selectively connected to ground G by suitable actuation of the relay tree.

The positioning bar 70 may be moved longitudinally to any of 64 positions controlled by a signal from a track address system 134. This track address system forms no essential part of the present invention and will not be described in detail other than to mention that this track address is capable of delivering a low level signal to be amplified and this signal is shaped to selectively energize the six relay groups according to the programing of binary digits. The least significant digit is transmitted over line $D_1$ to control the throw of relay group $R_1$. This selection is carried through the next two more significant digits controlled by relay groups $R_2$ and $R_3$ through lines $D_2$ and $D_3$. At this point the relay tree construction and function depart from a conventional relay tree for the following reasons: In order to avoid applying power to the complete potentiometer winding and thereby heating it unnecessarily, only eight sections of the winding on either side of the selected tap which is grounded have the excitation voltage applied thereto. Of course, the end connections $E_1$ and $E_2$ are always connected to the excitation transformer. This manner of connection reduces the input power of the potentiometer to one-fourth the value that would be required if the complete potentiometer had power supplied to it. The relays controlled by the three most significant digits of the track address are complicated by the fact that this excitation voltage applied to the potentiometer is to include only those eight sections of the potentiometer on either side of the grounded tap, and accordingly these relays have extra contacts.

From the foregoing it is evident that the track address must supply a control signal to indicate which of the 64 track positions should be sought by the transducer heads. The six-digit signal supplied by the track address functions, through the relay tree, to provide a ground for one of the 64 taps of the potentiometer and to excite the potentiometer winding eight taps on either side of the ground tap. The wiper voltage of the potentiometer, which is a measure of the error between the position commanded by the input signal and the present head position, is applied as an input to a servo amplifier 135. A velocity feedback signal from tachometer 55 mounted on the same shaft as servo motor 54 is also supplied as an input to servo amplifier 135. This servo amplifier supplies the control voltage which actuates the servo motor which in turn drives the potentiometer wiper 67 through a gear train to a null position of the wiper voltage which corresponds to the grounded tap of the potentiometer winding, i.e., the tap and hence the track selected by the address signal.

The potentiometer wiper voltage is also connected to an error signal amplifier 136 which serves two purposes. One purpose is to control relay 137 which in turn controls the application of power to the servo motor and tachometer and disconnects the power in the absence of a significant error signal. In the preferred embodiment when the error magnitude is over three thousandths of an inch (.003″) the error signal amplifier actuates relay 137 to close power supply switch 138.

The amplified signal from error signal amplifier 136 is also fed to a simple gating circuit, consisting of a pair of OR gates responsive to a signal of predetermined polarity only. The purpose of the gating circuit is to control the two detents used for final positioning of the heads. When the position error as indicated by the potentiometer is less than a predetermined minimum, i.e., .003 inch, and the binary value of the least significant digit of the track address is zero, one of the solenoids is de-energized and the other solenoid is energized. When the same error condition exists and the value of the least significant binary digit of the track address is 1, the previously de-energized solenoid is energized and the previously energized solenoid is de-energized.

In the operation of the device, the servo motor 54, governed by the track address as described above, drives the positioning bar 70 to a position corresponding to the selected track on the storage medium. This constitutes a coarse positioning which is accurate, for example, within five thousandths of an inch. During the time the servo motor 54 is running the solenoids 89—89 are energized by the presence of the error signal from the error signal amplifier thereby holding detent couplings 82, 83 out of engagement with the threads of bar 70. When the servo motor stops at the coarse adjustment position, the proper solenoid is held energized according to the least significant digit of the address while the other solenoid is deenergized, thereby allowing its corresponding spring 92 to force the threads of its detent coupling into the threads of the bar 70 and by this engagement superimpose an additional minute movement on the bar 70. This constitutes a fine and final positioning within one thousandth of an inch of the desired and selected position. This superposed movement on the bar 70 is possible because of a controlled lost motion between slot 77 and pin 79. When either of the detents is engaged this also acts as a positive lock for the selected final position of the bar 70 and hence the transducer heads with their selected track.

The operation of the device in selecting a particular track and locking the transducer head at that track location will now be described. For example, if it is desired to select record track No. 46 it is then necessary to ground tap $T_{46}$ of the potentiometer winding and apply the excitation voltage to potentiometer taps which are eight positions away from selected tap $T_{46}$. The track address will deliver a binary signal which corresponds to decimal number 45, which corresponding binary number is 101101. In the position shown in full lines in FIG. 12, the relay tree is adapted to select track $T_1$ when the binary address is 000000. With the binary address corresponding to the numeral 45, relay excitation signals will be transmitted along lines $D_6$, $D_4$, $D_3$, and $D_1$ while no relay actuating signal will be on lines $D_2$ and $D_5$. The signal transmitted will actuate the relays $R_1$, $R_3$, $R_4$, and $R_6$, to move their contacts to the positions shown in phantom lines in FIG. 12. Although all the contacts of these relay groups will be actuated only those contacts necessary to follow the circuit are shown in phantom lines in FIG. 12. It can thus be seen that the circuit connection from selected tap $T_{46}$ is through contact $CR_1$–46 through the connecting line to $CR_2$, as relay $R_2$ has not been actuated, and through the connecting line down to the contacts which have been moved by relay $R_3$ such as $CR_3$. The circuit connection is then in asimilar manner through the contact actuated by relay $R_4$, i.e., $CR_4$ and hence through the connecting line to the contacts of relay $R_5$ which have not been actuated and on through the contacts $CR_6$ of relay $R_6$ which have been actuated to ground; thus, relay tap $T_{46}$ is the only tap connected to ground. In a similar manner it can be seen from following the output connections of isolation transformer IT that the power from each side of the winding of IT will be connected by means of the relay contacts. For example, tracing from point *a* at one side of the secondary of isolation transformer the circuit can be traced through small letters *b, c, d, e, f, g, h* to potentiometer winding tap $T_{54}$. In a similar manner, starting at the other side of isolation transformer secondaries with the relays in position to select track 46, it can be seen by following the small letters *m, n, o, p, q, r, s, t* that the excitation voltage from this side of the isolation transformer will be applied to potentiometer winding tap $T_{38}$. As described above, in the presence of a large error signal the error signal amplifier 136 will actuate relay 137 closing switch 138, applying power to the servo motor which will, in a manner well known in the art, attempt to seek the null position or the selected tap 46. As long as there is a significant error signal, the output of error signal amplifier 136 is also fed to the OR gates and will keep the solenoids 89—89 actuated. At the time when the servo motor finds the selected tap $T_{46}$ and the error signal decreases to the point where the error signal amplifier will not supply enough of the signal to energize solenoids 89—89, then the signal transmitted over line $D_s$ from the track address will be controlling of the actuation of solenoids 89—89. This signal may be transmitted in the form of a bipolar signal and an inverter is in the line between the line $D_s$ and one of the OR gates so that the signal transmitted will be of opposite polarity at the OR gates. The signal which is transmitted over the line $D_s$ to one of the OR gates will hold the associated solenoid while the other solenoid will not be energized and the spring thereof will force its detent coupler into the threads of bar 70, thus superimposing the fine adjusting and locking action upon the bar 70 and holding the transducer heads in accurate alignment with the selected track of the record medium.

While there have been disclosed the novel features of this invention as applied to the preferred embodiment, it will be apparent that various omissions and substitutions and changes in the form and details of the device illustrated and in its operation may be made by those skilled in the art without departing from the spirit of the invention. It is the intention, therefore, to be limited only as indicated by the scope of the appended claims and the reasonable equivalents thereof.

We claim:

1. A positioning apparatus adapted to accurately position a magnetic transducer head adjacent a preselected track of a magnetizable record medium, the positioning being accomplished in two steps, a rough positioning step and a fine positioning step, said positioning apparatus comprising; movable support means for supporting said transducer head for movement relative to said record medium over a plurality of record tracks thereon, a motor operatively connected to said support means for moving said support means over a plurality of record tracks, signal translating means for energizing the motor in accordance with an incoming signal to select a track of said record medium in accordance with said signal, thereby causing the motor to move said support means to the neighborhood of said selected track and accomplish the rough adjustment, and detent means cooperating with said support means and operative independently of said motor in accordance to said incoming signal to superimpose an additional movement upon said support means after the transducer head has been positioned in the vicinity of the pre-selected track by said motor to thereby accurately position the head in alignment with said pre-selected track and accomplish the fine adjustment.

2. A device as defined in claim 1 wherein said signal translating means includes a relay tree and a potentiometer having a plurality of taps corresponding to the tracks of the record medium, the relay tree and potentiometer being connected such that the relay tree is operable to ground one selected track of the potentiometer in accordance with said incoming signal and also apply a excitation voltage to a selected small portion of the potentiometer winding on each side of the grounded tap.

3. In a magnetic storage apparatus including a plurality of rotatable discs with a magnetizable surface layer thereon having a plurality of record tracks, a plurality of magnetic transducer heads associated with each surface layer, each transducer head being movable over a plurality of tracks on the magnetizable surface layer in accordance with a command signal, and a positioning apparatus for positioning said heads at the commanded track in accordance with said command signal, said positioning apparatus comprising; a carrier supporting said transducer heads adjacent said magnetizable surface layer, an axially movable bar attached to said carrier for moving said carrier to move the heads carried thereby over a group of record tracks, a servo motor operatively connected to said bar through a lost motion connection for axially moving said bar, signal translating means for supplying a signal to said servo motor to cause said servo motor to move said bar and said carrier to position the heads in the vicinity of the selected track, and a detent mechanism cooperating with said axially movable bar to superimpose a fine adjustment thereon after the head is in the vicinity of the selected track to accurately align the head with the selected track and to lock the head in its accurately aligned position.

4. A device as defined in claim 3 further comprising means connecting said axially movable bar to said carrier, said means being rigid in the direction of movement of said carrier while allowing limited misalignment in planes spaced 90° from said line of movement.

5. A positioning apparatus for accurately positioning at least one magnetic transducer head adjacent a pre-selected track of a plurality of tracks on a magnetizable record medium in response to a command signal, said positioning apparatus comprising; a movable support carrying said transducer head for movement over the range of tracks on said magnetizable record medium, a motor operatively connected to said movable support, signal translating means for translating an incoming command signal and energizing the motor in accordance therewith to cause said motor to move said support means to the vicinity of a selected track of said record medium in accordance with said incoming command signal, and a means cooperating with said movable support for superimposing a fine adjustment independently of said motor upon said support in accordance with said command signal.

6. A device as defined in claim 5 wherein said movable support includes an axially movable bar, and a lost motion connection is provided between the motor and the axially movable bar.

7. A device as defined in claim 6 wherein the fine adjustment means includes a detent means and the detent means further includes a solenoid actuated detent coupler for cooperating with a detent coupling on the axially movable bar.

8. A device as defined in claim 7 wherein the detent coupling on the movable bar and on the detent coupler is in the form of screw threads and the detent coupler is biased into engagement and disengageable when the solenoid is energized.

9. A two-step positioning apparatus adapted to position at least one magnetic transducer head adjacent a preselected track on a magnetizable record medium which track is preselected from a plurality of such tracks, said positioning apparatus comprising; a support carrier for supporting said magnetic transducer head for movement over the plurality of tracks on said record medium, an axially movable bar operatively connected to said support carrier, a motor operatively connected to said movable bar for moving said bar, means for actuating said motor in accordance with a predetermined command signal to move said bar and hence said carrier to the vicinity of a preselected track, and a detent mechanism cooperating with said bar for superimposing a fine adjusting movement thereon independent of said motor to accurately align the transducer head with the preselected track and lock the transducer head in its accurately aligned position.

10. A device as defined in claim 9 wherein the connection between the motor and the axially movable bar is in the form of a lost motion connection thereby allowing the bar to be moved independently of the motor.

11. A device as defined in claim 10 wherein said motor rotatably drives a screw, and a nut cooperating with said screw is attached to said axially movable bar through said lost motion connection.

References Cited in the file of this patent

UNITED STATES PATENTS

| | | |
|---|---|---|
| 2,497,142 | Shepherd | Feb. 14, 1950 |
| 2,800,769 | Newell | July 30, 1957 |
| 2,832,841 | Eldridge | Apr. 29, 1958 |
| 2,840,771 | Kamm | June 24, 1958 |
| 2,901,738 | Willard | Aug. 25, 1959 |

OTHER REFERENCES

IBM Tech Pub. (dwg. 2 pp. spec. 5 pp.) Dec. 11, 1957, 340–174. 1D, Engineering Design of a Random-Access Memory by Noyes and Dickinson.

Notice of Adverse Decision in Interference

In Interference No. 93,328 involving Patent No. 3,009,759, F. A. Johnson and H. E. Miller, Positioner for a magnetic data storage device, final judgment adverse to the patentees was rendered July 15, 1964, as to claims 1, 5 and 6.

[*Official Gazette October 27, 1964.*]